United States Patent [19]

Goodchild et al.

[11] Patent Number: 4,829,260

[45] Date of Patent: May 9, 1989

[54] PHASE-SHIFT KEYED CARRIER RECOVERY

[75] Inventors: Edward J. G. Goodchild; Richard T. A. Standford, both of Berkshire; Roger T. Biggs, Surrey, all of England

[73] Assignee: British Aerospace Public Limited Company, London, England

[21] Appl. No.: 109,655

[22] Filed: Oct. 19, 1987

[30] Foreign Application Priority Data

Oct. 20, 1986 [GB] United Kingdom ............... 8625117

[51] Int. Cl.$^4$ ............................................. H03D 3/18
[52] U.S. Cl. ..................................... 329/50; 329/107; 329/110; 329/126; 375/77; 375/86
[58] Field of Search ................. 329/50, 107, 110, 112, 329/122, 126, 137; 375/77, 83, 86, 80, 94; 455/46, 202, 205, 214, 337

[56] References Cited

U.S. PATENT DOCUMENTS 4,635,279  1/1987  Nossen ........................... 329/112 X Primary Examiner—David Mis
Attorney, Agent, or Firm—Cushman, Darby & Cushman

[57] ABSTRACT

Data transmitted over an n-state phase-shift keyed transmission system which has an inherently suppressed carrier is recovered using digital processing techniques. The received signal is digitized and a digital representation of the suppressed carrier signal recovered directly from the digital representation of the received signal. The digital representation of the received signal is interacted with the digital representation of the carrier signal to recover the transmitted data. A preferred aspect recovers the carrier by subjecting the digital representation of the received signal to a non-linear processing step to generate the nth order harmonic.

16 Claims, 10 Drawing Sheets

HALF-WAVE RECTIFIED

ALTERNATIVE LOBE INVERSION ($F_{1/2}$ + HARMONICS)

TIME DOMAIN         FREQUENCY DOMAIN

FUNCTION 1

FUNCTION 2

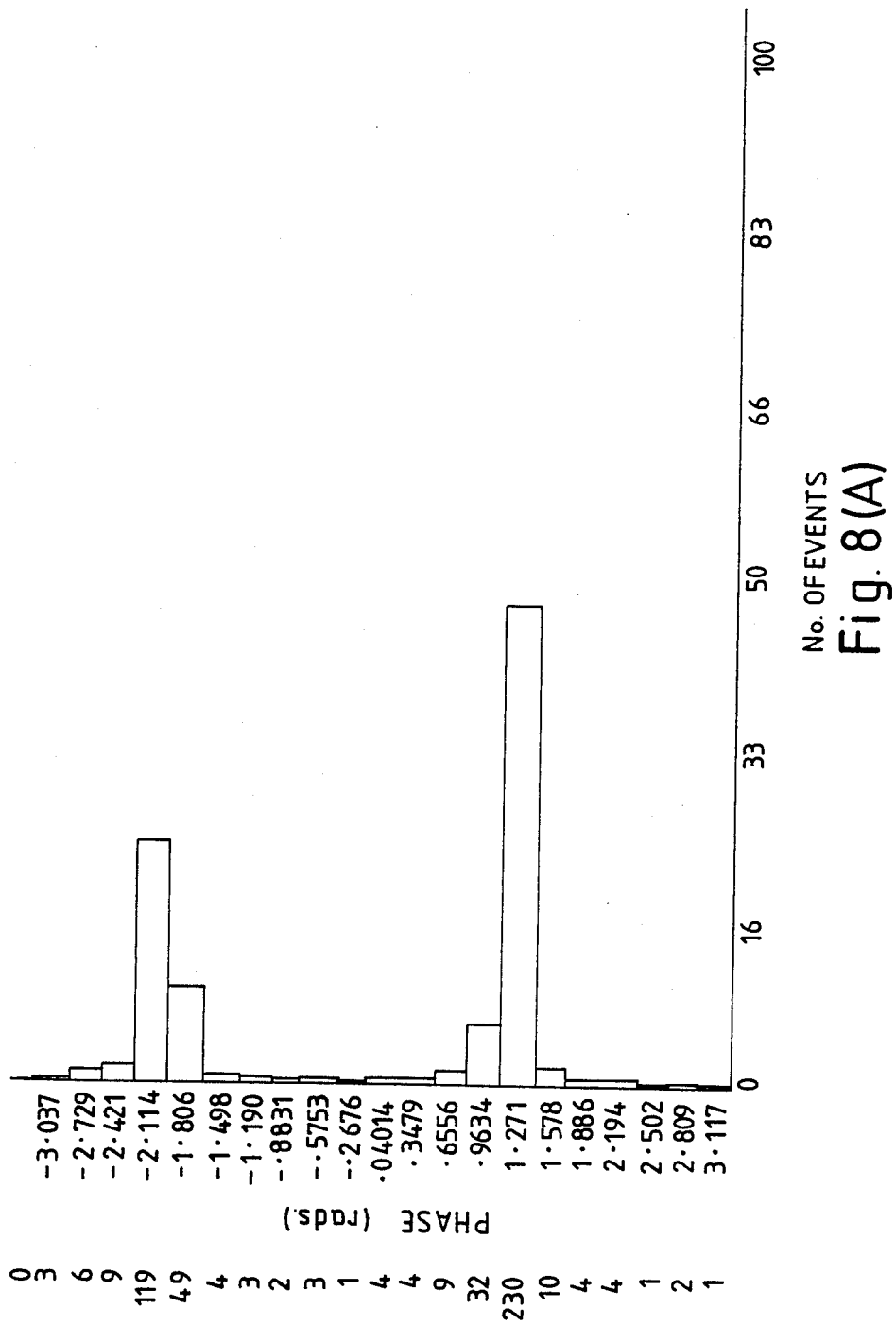

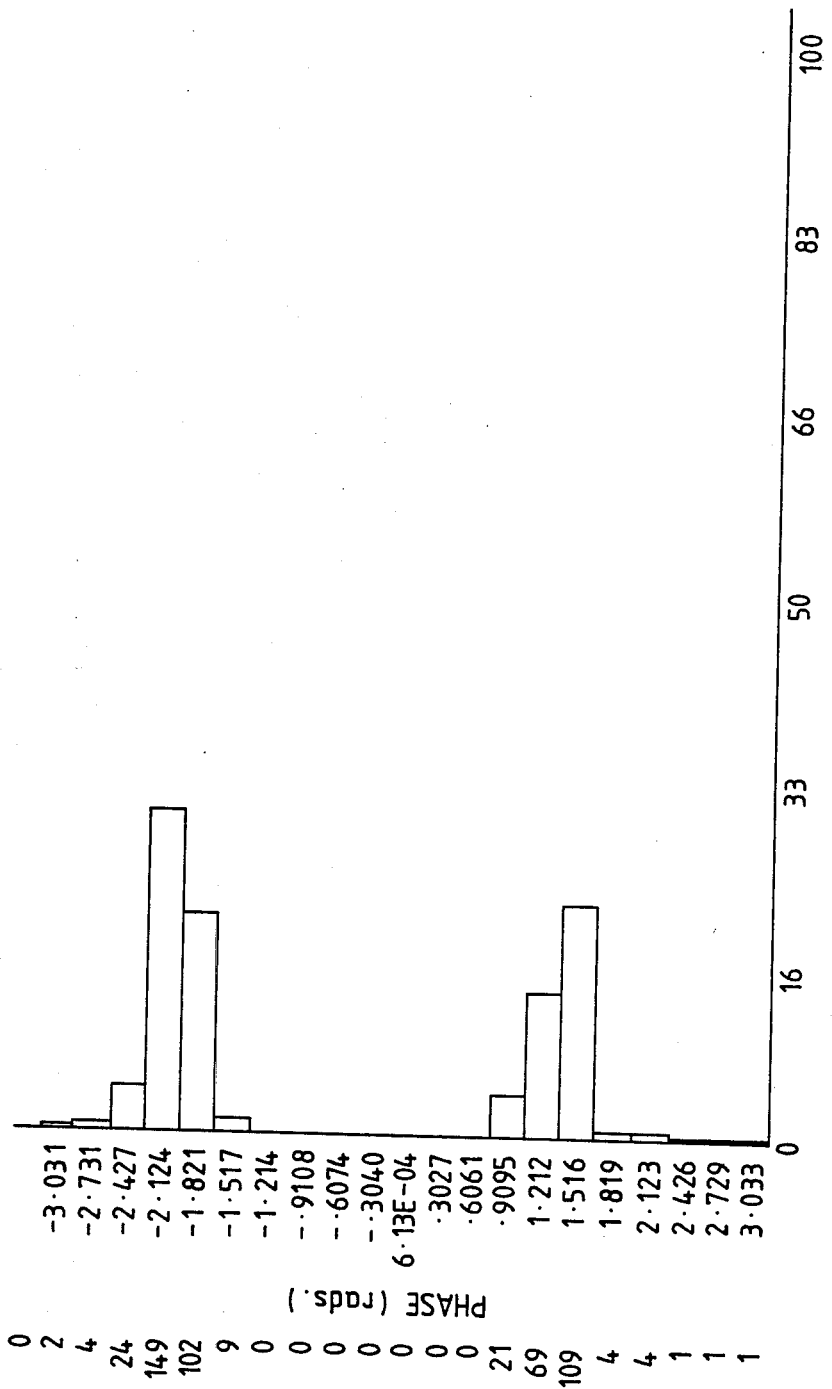

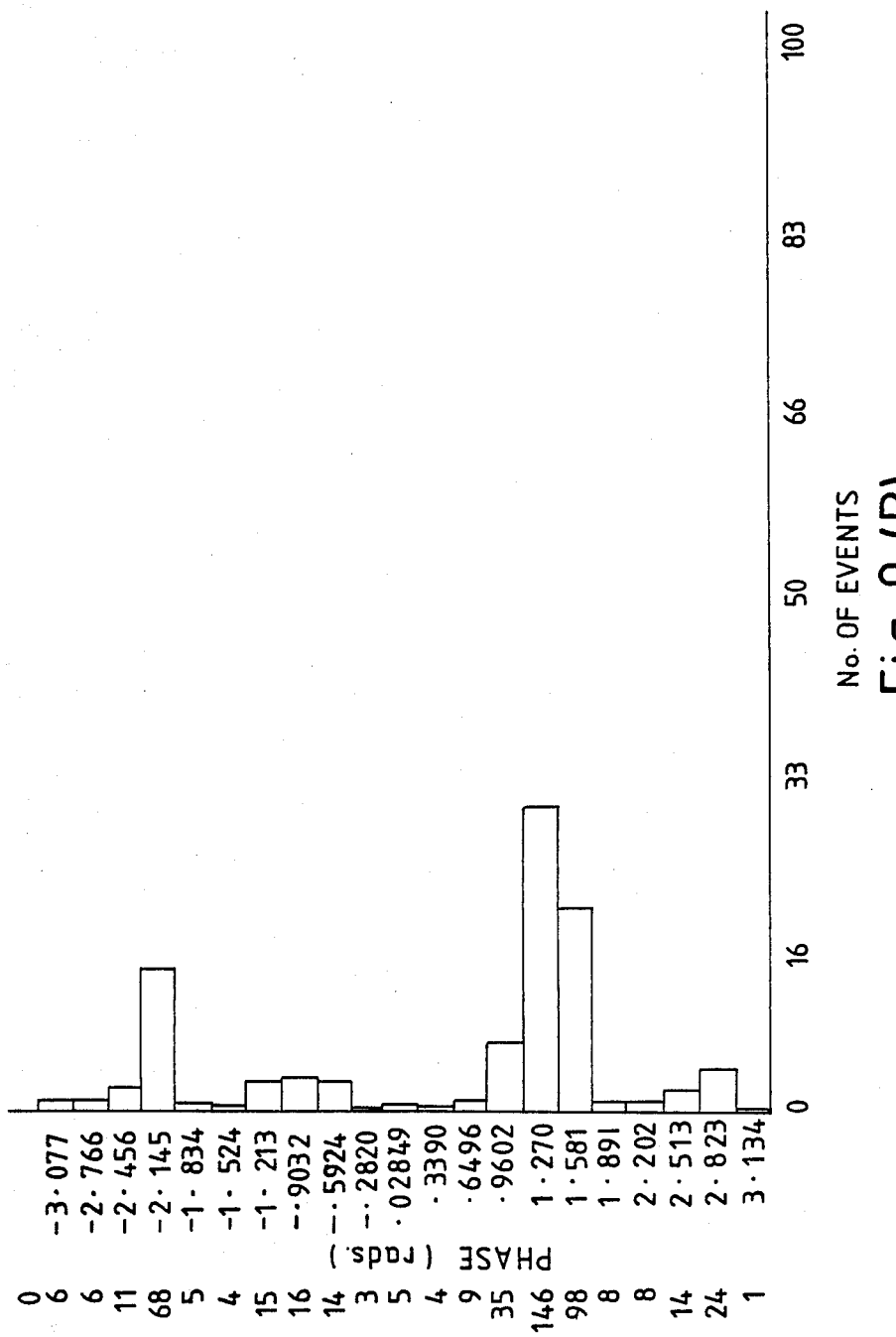

PHASE-SHIFT KEYED CARRIER RECOVERY

BACKGROUND OF THE INVENTION

Phase-shift keying is commonly used to convey information in digital form over a transmission medium. The demodulation of signals encoded using this method requires the multiplication of the received signal with a replica of the carrier, the signal that would have been received in the absence of modulation. This replica must have the correct frequency and phase to within a fraction of a cycle. In practice synchronisation is difficult to achieve over long or imperfect transmission paths. Maintenance of synchronism may be made more difficult if the path is time variant as a result of the motion of the transmitter and/or the receiver or if the characteristics of the transmission medium fluctuate.

Conventionally various methods are available for obtaining the required synchronising information. Firstly, a pilot carrier signal may be transmitted and superimposed on the phase-shift keyed signal and this pilot carrier then extracted at the receiver and used to synchronise the local oscillator which generates the carrier signal at the receiver. Alternatively, a phase-locked loop which locks onto either the phase-shift keyed signal or onto a pilot carrier may be used at the receiver to drive the phase difference between the received signal and the local oscillator of the receiver to zero. In general these methods are implemented using analogue techniques.

European Patent Application No. 84300682.6 does disclose a system in which decoding takes place in the digital domain. In this system a digital representation is produced of a signal received after transmission over an n-state phase-shift keyed data transmission system, a digital representation of a carrier signal is produced, and then the transmitted data is recovered using data processing techniques. However, the digital representation of the carrier signal is produced simply by a digital implementation of the commonly used analogue techniques involving the use of a local oscillator. Accordingly this method has the same disadvantages as the analogue techniques.

SUMMARY OF THE INVENTION

According to this invention a digital representation of the suppressed carrier signal transmitted over the system is recovered directly from the digital representation of the received signal and is subsequently interacted with the digital representation of the received signal to recover the transmitted data.

The present invention uses digital processing techniques to recover the suppressed carrier directly from the received signal. It thereby avoids the necessity of using a local oscillator to recover the data and all the difficulties associated with obtaining correct synchronisation of such a local oscillator.

Preferably the digital representation of the received signal is processed by subjecting it to a non-linear signal processing step in which a representation of the nth order harmonic of the carrier signal is generated, and processing the non-linear signal to produce the digital representation of the carrier signal.

Where the transmission system has an odd number of states the non-linear signal processing step may include the generation of the odd harmonics by hard limiting the signal or by raising the digitised signal to the nth power. Where the transmission system has an even number of states the non-linear signal processing step may also include raising the digital representation of the received signal to the nth power to generate the representations of the nth order harmonic of the carrier signal. Alternatively, where $n=2^N$ and N is an integer the digital representation of the received signal may be squared N times. However where the transmission system has an even number of states the non-linear processing step applied to the digital representation of the received signal preferably involves taking the modulus of the digital representation of the received signal. This generates digital representations of the even order harmonics of the received signal. Taking the modulus of a digital signal formed by, for example 8 or 12 bit word including a sign bit, simply involves setting the sign bit of each digital word to the code to indicate a positive quantity.

The process by which even harmonics are generated by taking the modulus may be more easily understood by considering the process as the combination of two waveforms. Consider first a simple sinusoidal waveform with frequency $f_0$ as the received signal. To produce the modulus of this first signal it must be multiplied by a second signal which takes the value +1 when the first signal is positive and −1 when the first signal is negative. By this combination the resultant multiplied signal is always positive. The second signal having such characteristics is simply a squarewave with the same phase and period as the first signal. Such a squarewave has half wave symmetry and any signal with half wave symmetry and a repetition rate $f_0$ has Fourier components which are simply an odd order harmonic series with fundamental frequency $f_0$. Accordingly the multiplication of the first signal by the second signal is equivalent to multiplying $$\sin \omega$$

where $\omega$ is the angular frequency corresponding to $f_0$, so that $\omega = 2\pi f_0$ by the series $$A \sin(\omega) + B \sin(3\omega) + C \sin(5\omega) + \ldots$$

A general term of this latter series takes the form $Z_p \sin(p\omega)$ where p is an odd integer.

It may simply be shown that the general term of the resulting product is:

$$X_p \sin((p-1)\omega).$$

Since p is an odd integer (p−1) is even and this series is simply an even order harmonic series having a fundamental frequency $f_0$.

Preferably the processing of the representation of the nth-order harmonic is performed by a lobe removal process followed by filtering. Thus the digital representations of n−1 consecutive half-wave lobes of the signal are removed or set to the code for zero magnitude, leaving only the digital words corresponding to the nth lobes of the signal. Where n is factorisable, this process is best achieved in stages by dividing by each factor in turn and filtering in between each division. Where n is an even number the processing is preferably carried out by frequency halving the representation of the digital signal containing the nth order harmonic and subsequently changing the sign of the digital words in alternate lobes of the rectified time series. Thus the processing technique sets the digital words having a negative sign bit to be equal to the digital word code representing zero magnitude, and the digital words having a positive sign bit in alternate groups of digital words corresponding to alternate lobes of the signal have their sign changed to the code for a negative number.

According to a second aspect of this invention a demodulator for demodulating a suppressed carrier n-state phase shift keyed data transmission comprises an analogue to digital converter to generate a digital representation of a received signal, non-linear processing means which acts on the digital representation of the received signal to generate digital representations of the nth-order harmonic of the carrier signal, further processing means to process the signal output by the non-linear processing means to produce a digital representation of the carrier signal, Hilbert transform means for providing a Hilbert transform of the digital representation of the carrier signal or of the received signal, multiplier means to multiply the digital representations of the received signal and carrier signal and to multiply the output of the Hilbert transform means with the digital representation of the received signal or carrier signal, respectively, and data recovery means to recover the transmitted data from the output of the multiplier means.

Where the transmission system has an even number of states the non-linear processing means may raise the digital representation of the received signal to the nth power to generate the representations of the nth order harmonic of the carrier signal or, alternatively, where $n = 2^N$ and N is an integer, the digital representation of the received signal may be squared N times. However, it is preferred that the non-linear processing means takes the modulus of the digital representation of the received signal.

The further processing means preferably includes frequency division means to reduce the frequency of the signal output by the non-linear processing means and filter means to select the digital representation of the carrier signal. The frequency division means preferably processes the representation of the nth-order harmonic by a lobe removal process in which the digital representations of $n-1$ consecutive half-wave lobes of the signal are removed or set to the code for zero magnitude, leaving only the digital words corresponding to the nth lobes of the signal. Where n is factorisable, this process is best achieved in stages by dividing by each factor in turn and having filter means between each division stage. Where n is an even number the frequency division process is preferably carried out by a frequency halving process on the representation of the digital signal containing the nth order harmonic and subsequently changing the sign of the digital words in alternate lobes of the rectified time series. Thus this processing technique sets the digital words having a negative sign bit to be equal to the digital word code representing zero magnitude, and the digital words having a positive sign bit in alternate groups of digital words corresponding to alternate lobes of the signal have their sign changed to the code for a negative number.

Preferably the filter means is formed by an infinite impulse response band pass filter centered on the frequency of the nth-order harmonic of the carrier signal, or on a factor of this. Preferably the Hilbert transform means is formed by a finite impulse response filter.

The non-linear processing means and the further processing means may be implemented by hard wired logic circuitry but, more usually, are implemented by a programmed computer. In theory, the entire processing could be carried out on a single microcomputer. In practice, however, such a solution is unlikely to be able to operate in real-time on real signals. More likely configurations vary from two high-speed, general-purpose microcomputers operating in parallel, to a larger number of microprocessors, possibly including specialised digital signal processing (DSP) microprocessors.

In the two microcomputer case, the most likely organisation is for one microcomputer to perform the carrier recovery task while the other performs the demodulation. More complex arrangements using more processors would improve the overall performance and signalling speed capability, and would probably be necessary for signals having more than four states. Such a system would use individual processing elements to carry out each processing function and thus separate processing elements would be used for the Hilbert Transform means, the filter means, and the non-linear processing means. In the limit each individual sub-process could be allocated by a single processor element, which could be a general purpose, or a specialised DPS, microprocessor, according to the sub-process concerned.

When two microcomputers are used preferably it is the digital representation of the received signal which is fed to the Hilbert transform means and then one microcomputer carries out the Hilbert transformation and the demodulation process and the other microcomputer carries out the carrier recovery tasks. This results in a more even distribution of processing between two computers.

2 or 4 state phase shift keyed transmission systems are the most common and, in this case preferably the method and apparatus in accordance with this invention use as the nth order harmonic of the carrier signal the fourth harmonic and the carrier signal is recovered from the fourth harmonic by two frequency division stages.

The present invention enables the coherent demodulation of a phase-shift keyed signal without the need of a phase-locked loop oscillator. This enables phase-shift keyed signals of two or more equidistant states to be coherently demodulated by reconstructing the carrier frequency. The only prior knowledge which is required to implement the process is an approximate estimate of the centre frequency and bandwidth of the transmitted data signal and the number of phase states.

BRIEF DESCRIPTION OF THE DRAWINGS

A particular example of a method and apparatus in accordance with this invention will now be described with reference to the accompanying drawings, in which:

FIGS. 8A and B are histogram block plots of recorded phase measurements for a two state PSK signal having a 10 dB and 0 dB signal to noise ratio respectively; and, FIGS. 9A and B are histogram plots of recorded phase measurements for a four state phase-shift keyed signal at 10 dB and 0 dB signal to noise ratio, respectively.

DESCRIPTION OF PREFERRED EMBODIMENT

A phase-shift keyed signal (PSK) with a uniform distribution of all the phase states contains no energy at the carrier frequency and the spectral description is a peak in energy distributed about the carrier frequency with a bandwidth determined by the reciprocal of the bit or digit period. The carrier frequency can only be estimated from the distribution of amplitudes with frequency. A non-linear process (eg. squaring), on a 2 state PSK signal produces a well defined component at twice the carrier frequency, in the absence of noise. If this component is discernable in the presence of noise then a sequence of filtering and frequency division yields the required carrier frequency term directly. The bandwidth of the filters is determined by the accuracy of the centre frequency estimate. In the case of a 4 state PSK it is necessary to implement a non-linear process which produces a frequency component at 4 times the carrier frequency, to achieve a similar result, and so on.

The carrier can be recovered, in the case of 2 state PSK, by taking the modulus of the signal and inverting alternate lobes. However, an algorithm which achieves this is necessarily complicated with the introduction of band-limited signals, and it is necessary to 'detect' the transitions in order to implement the correct phase lobe reversals. It is simpler, therefore, to generate the transition free 4th harmonic of the carrier frequency and sequentially filter and frequency divide to arrive back at the fundamental carrier signal.

Figure 1:
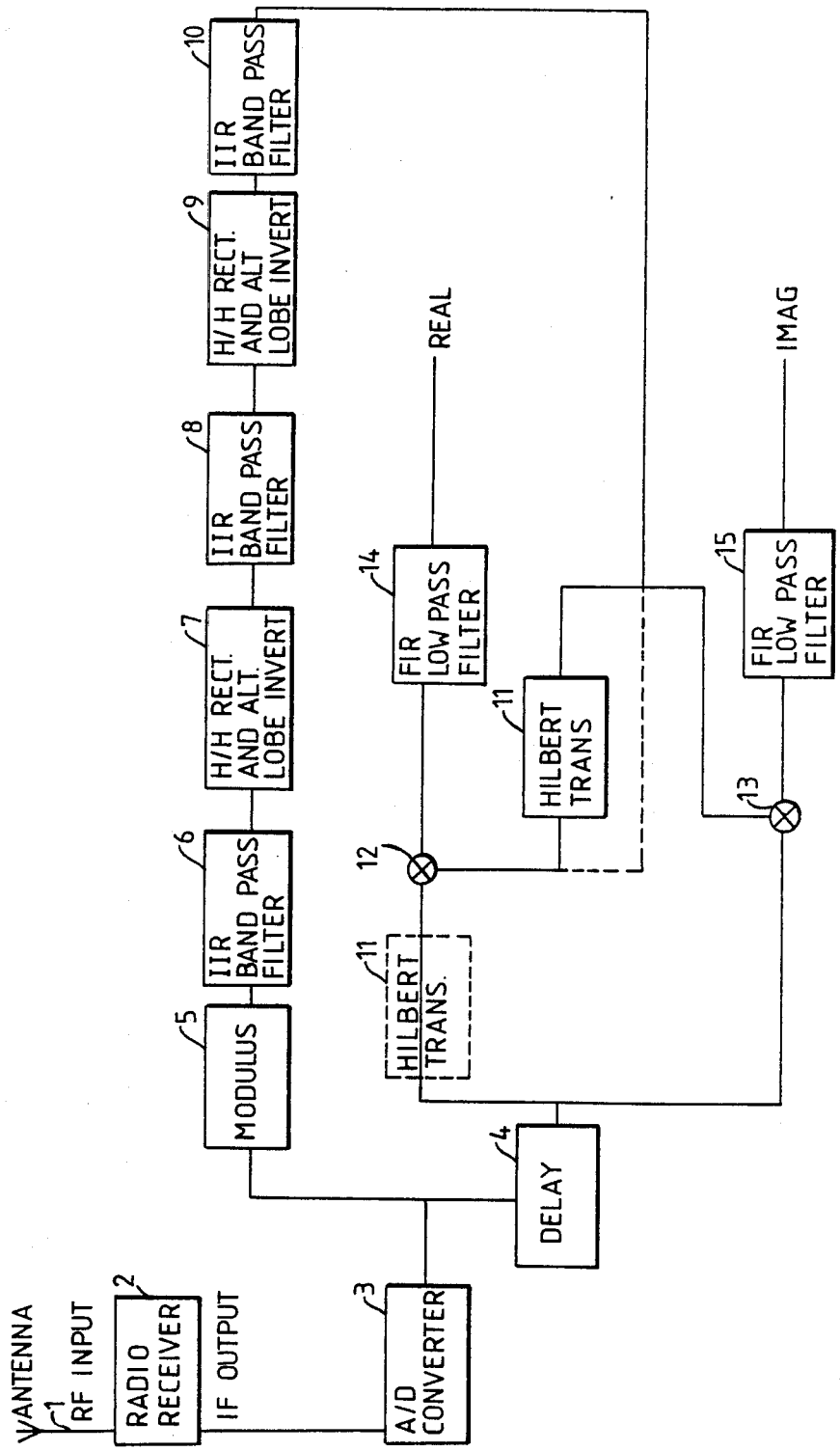
FIG. 1 is a block diagram of the demodulator.

FIG. 1 shows a block diagram of such a system. A phase-shift keyed signal is picked up by an antenna 1 and used as the RF input into a radio receiver 2. The IF output of the radio receiver 2 is fed to an analogue to digital converter 3 where the analogue IF output is sampled at regular time intervals and digital words representing the amplitude and polarity of the input signal at each time instant are provided as an output from the analogue to digital converter 3. Typically the analogue to digital converter 3 outputs 8 or 12 bit words the first bit of which is a sign bit. The output of the analogue to digital converter 3 is fed to a delay circuit 4 and a data processing circuit 5 which produces the modulus of the digital signals. The circuit 5 achieves this by simply changing the sign bit of each of the digital representations so they all indicate a positive number. The output of the circuit 5 is then fed through an infinite impulse response bandpass filter 6 having a pass band centered on $4f_0$ where $f_0$ is the frequency of the carrier signal. The output of the band pass filter 6 is fed to a half-wave rectifying and lobe inversion circuit 7 in which all digital words having a negative sign bit are changed so that they correspond to digital words having a zero magnitude and then digital representations appearing in alternate lobes of the resulting half-wave rectified signal have their sign bits changed so that they correspond to that for the code for a negative signal. This provides a signal which alternates between positive and negative and thus has a substantial component at $2f_0$. This signal is filtered in a second infinite impulse response band pass filter 8 having a pass band centred on $2f_0$. The output of the second pass band filter 8 is then fed to a second half-wave rectifying an alternate lobe inversion circuit 9 the output of this is fed to a third infinite impulse response bandpass filter 10. The third band pass filter 10 has its pass band centred on the carrier frequency $f_0$.

The output of the third bandpass filter 10 is a digital representation of the carrier signal and this is then fed via a Hilbert transformer 11 to a multiplier 12 and directly to a multiplier 13. The multipliers 12 and 13 are connected to the output of the delay circuit 4 and thus, in the multipliers 12 and 13 the digital representations of the carrier signal are multiplied with the digital representations of the received signal output from the analogue to digital converter 3.

In an alternative arrangement shown in chain-dotted lines in FIG. 1 the output from the third band pass filter 10 is applied directly to both multipliers 12 and 13 and the output from the delay circuit 4 is transformed by the Hilbert transformer 11 before being multiplied in the multiplier 12. In both cases the outputs of the multipliers 12 and 13 are then fed through finite impulse response low pass filters 14 and 15 the outputs of which are the real and imaginary components of the input signal, respectively. Any message ambiguity in the output arising from uncertainty as to which signal state is represented by a given phase state may be resolved by the use of conventional coding techniques.

Figure 2A:
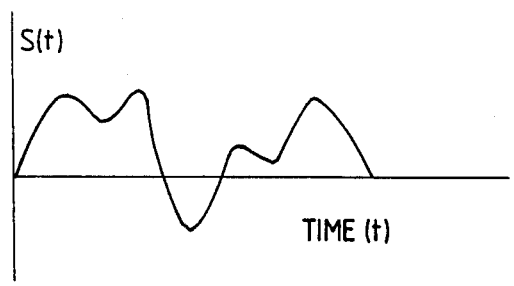
FIGS. 2A and B are graphs of a phase-shift keyed waveform and its digital representation, respectively.
Figure 2B:
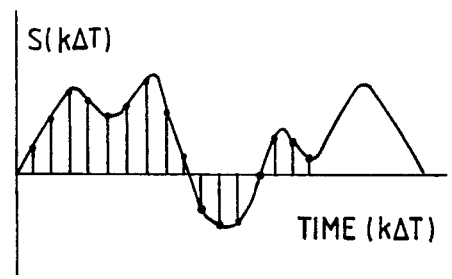
Figure 3A:
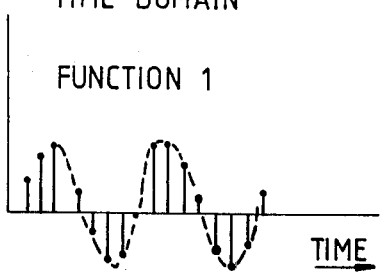
FIGS. 3A, C and D are graphs of amplitude against time an.d FIGS. 3B, E, and F are graphs of amplitude against frequency, illustrating the taking of the modulus of the received signal.
Figure 3B:
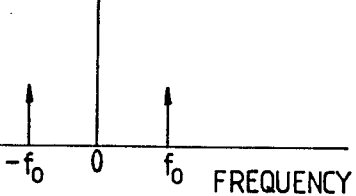
Figure 3C:
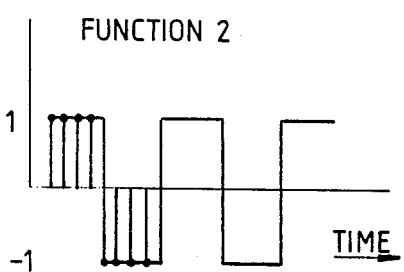
Figure 3D:
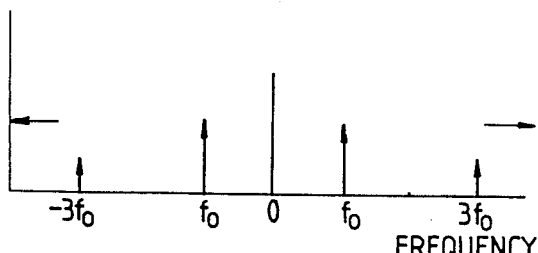
Figure 3E:
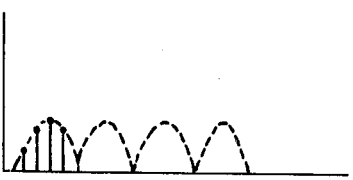
Figure 3F:
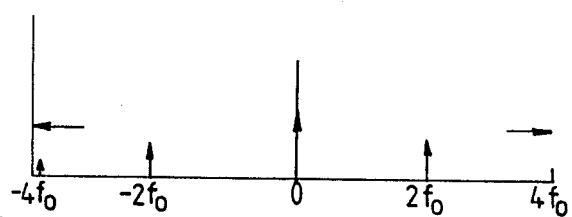

FIGS. 2A and 2B illustrate graphically a typical IF output signal from the radio receiver 2 and illustrate how the analogue to digital converter 3 samples this output signal at regular units of time. FIGS. 3A to F illustrate graphically the operation of the processing circuit 5. FIGS. 3A and B illustrate the output of the analogue to digital converter 3 in the time and frequency domain, respectively. Taking the modulus of the signal is equivalent to multiplying it by a square-wave having the same period and frequency. FIGS. 3C and 3D illustrate this square-wave again in both the time domain and the frequency domain. FIGS. 3D and 3E illustrate the result of this multiplication again in both the time domain and the frequency domain and illustrate how all of the even harmonics of the fundamental frequency $f_0$ are produced.

Figure 4A:
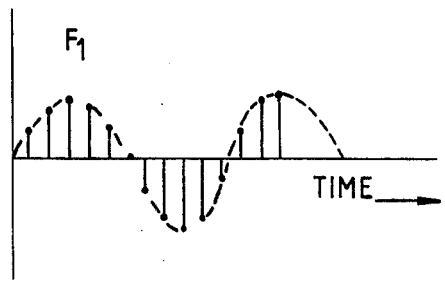
FIGS. 4A, B and C are graphs of amplitude against time illustrating the operation of the half-wave rectification and lobe inversion processing.
Figure 4B:
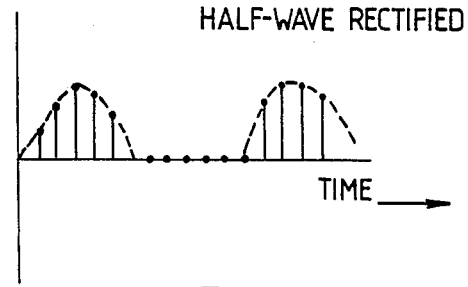
Figure 4C:
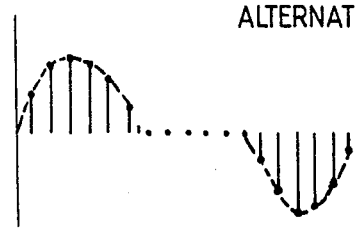

FIG. 4 illustrates the operation of the half-wave rectification and alternate lobe inversion circuits 7 and 9. FIG. 4A illustrates the output from the infinite impulse response band ass filter 6 or 8 and shows that it has a typical sinusoidal form when output by the band pass filter 6 or 8. Firstly, all the digital words having a negative sign bit are set to zero magnitude resulting in a half-wave rectified signal as shown in FIG. 3B. The digital words in alternate lobes then have their sign bit changed so that the wave-form of the signal corresponds approximately to a sinusoidal wave-form as shown in FIG. 3C. This wave-form is shaped in the subsequent band pass filter 8 or 10.

Figure 5:
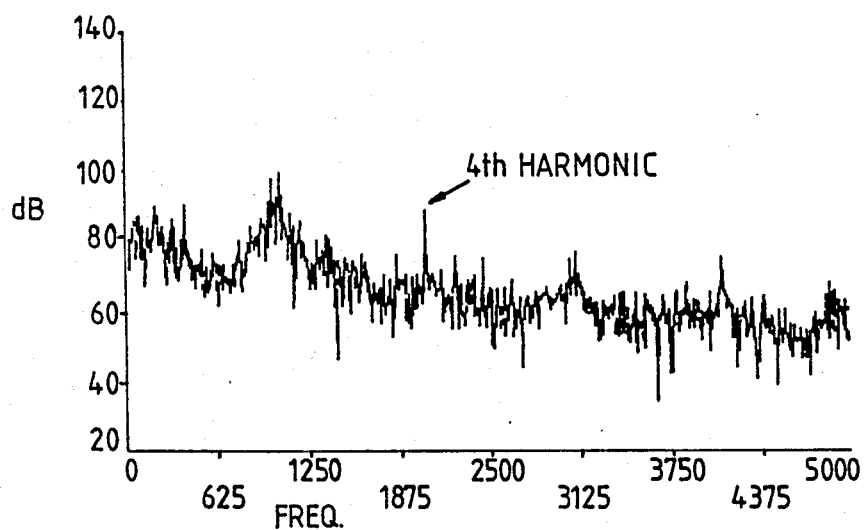
FIGS. 5, A and B are both graphs of amplitude against frequency to show the spectrum of the modulus of the received signal with a 10 dB and a 0 dB signal to noise ratio, respectively.
Figure 5:
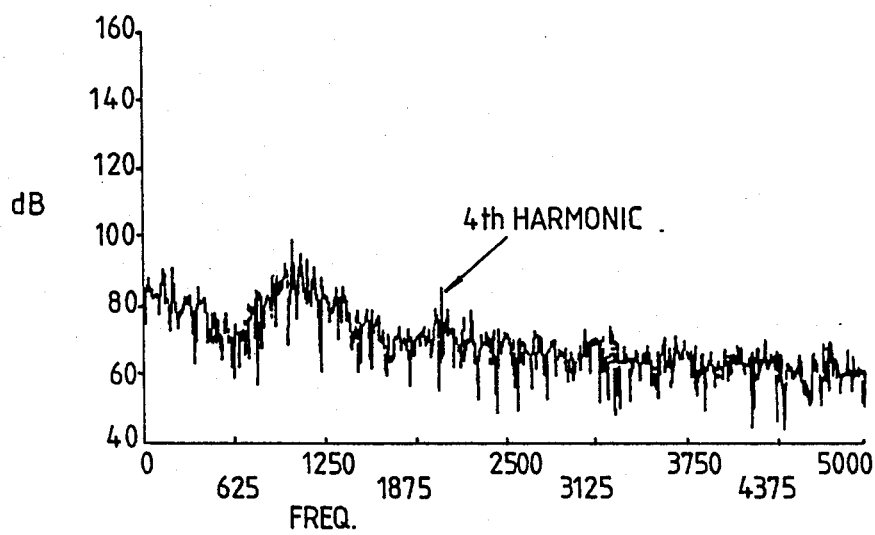
Figure 6:
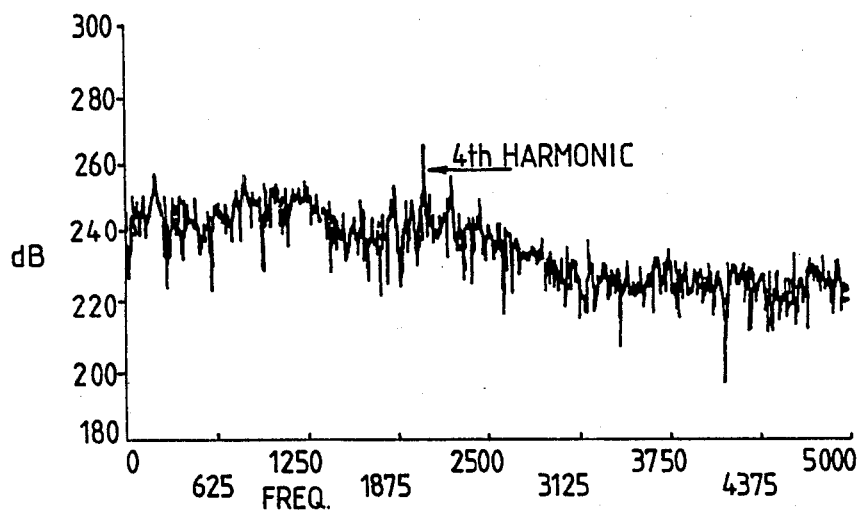
FIGS. 6, A and B are both graphs of amplitude against frequency of the fourth power of the received signal again at 10 dB and 0 dB signal to noise ratio respectively.
Figure 6:
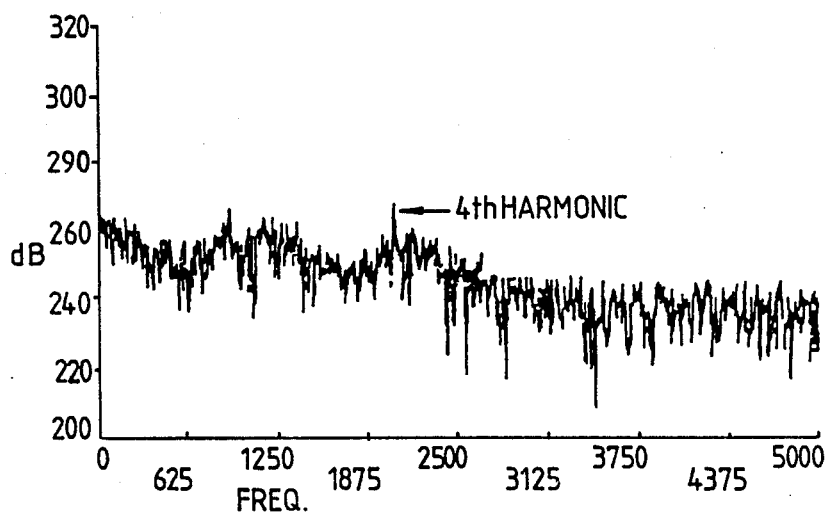

FIGS. 5 and 6 show the effect in the frequency domain of the two non-linear processes with FIG. 5 showing the modulus of the signal and FIG. 6 showing the signal raised to the 4th power. The signal is raised to the 4th power in two squaring stages with a high pass filtering process in between to remove any d.c. component. As a result there is no second harmonic term in FIG. 6 but there is in FIG. 5. With respect to the 4th harmonic, both processes are comparable, with the amplitude discernable above the background even at 0 dB S/N over a 5 kHz bandwidth. Taking the modulus as described above is a much simpler operation in terms of digital signal processing and is thus the preferred technique.

Figure 7:
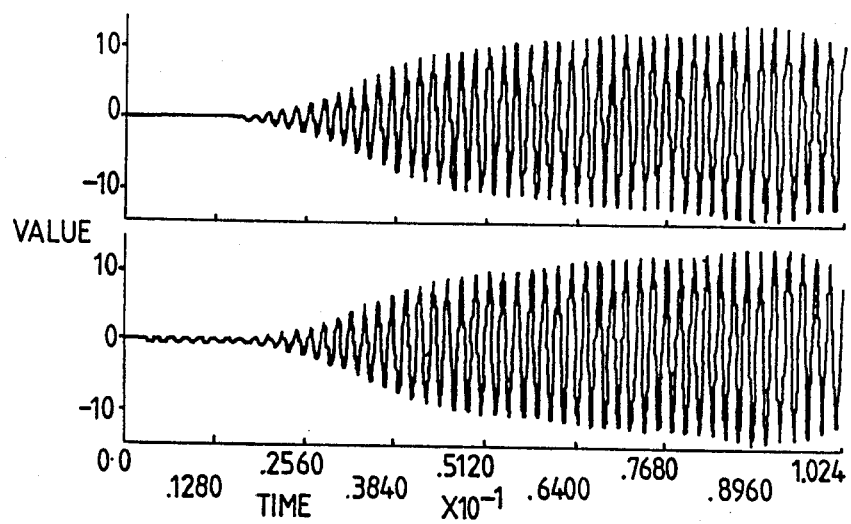
FIGS. 7, A and B are graphs of amplitude against time showing, the extracted carrier frequency and a typical demodulated output, respectively.
Figure 7:
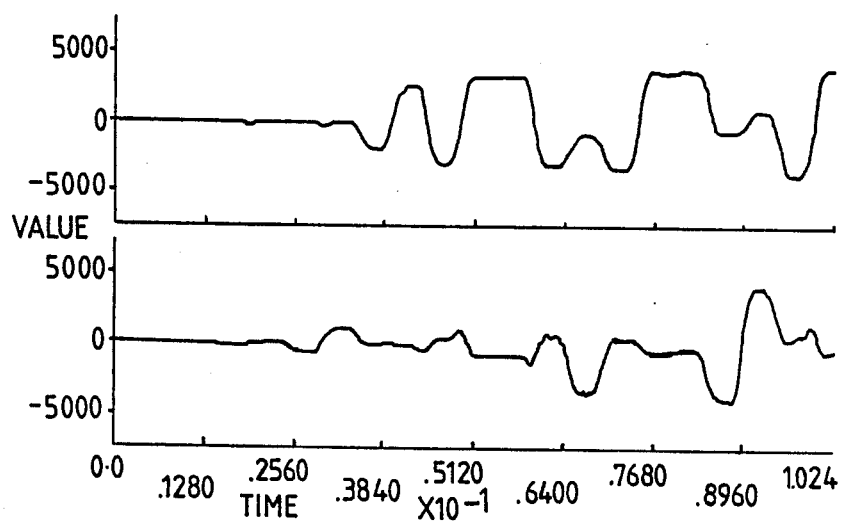

FIG. 7a shows the extracted carrier time series, used to drive- the coherent de-modulator. The expected delay and overall rise-time of the various filters can be seen and no attempt has been made to optimise their performance in this example.

FIG. 7b shows a typical de-modulated output for a 4 state PSK signal. Since the extracted carrier frequency has some arbitrary phase shift, with respect to the signal, the ideal real and imaginary outputs have amplitudes proportional to, $COS(\theta)$, $SIN(\theta)$, $COS(\theta)$, $-SIN(\theta)$ Real $-SIN(\theta)$, $COS(\theta)$, $SIN(\theta)$, $-COS(\theta)$ Imag for each of the 4 states, where $\theta$ is the phase difference.

Figure 9A:
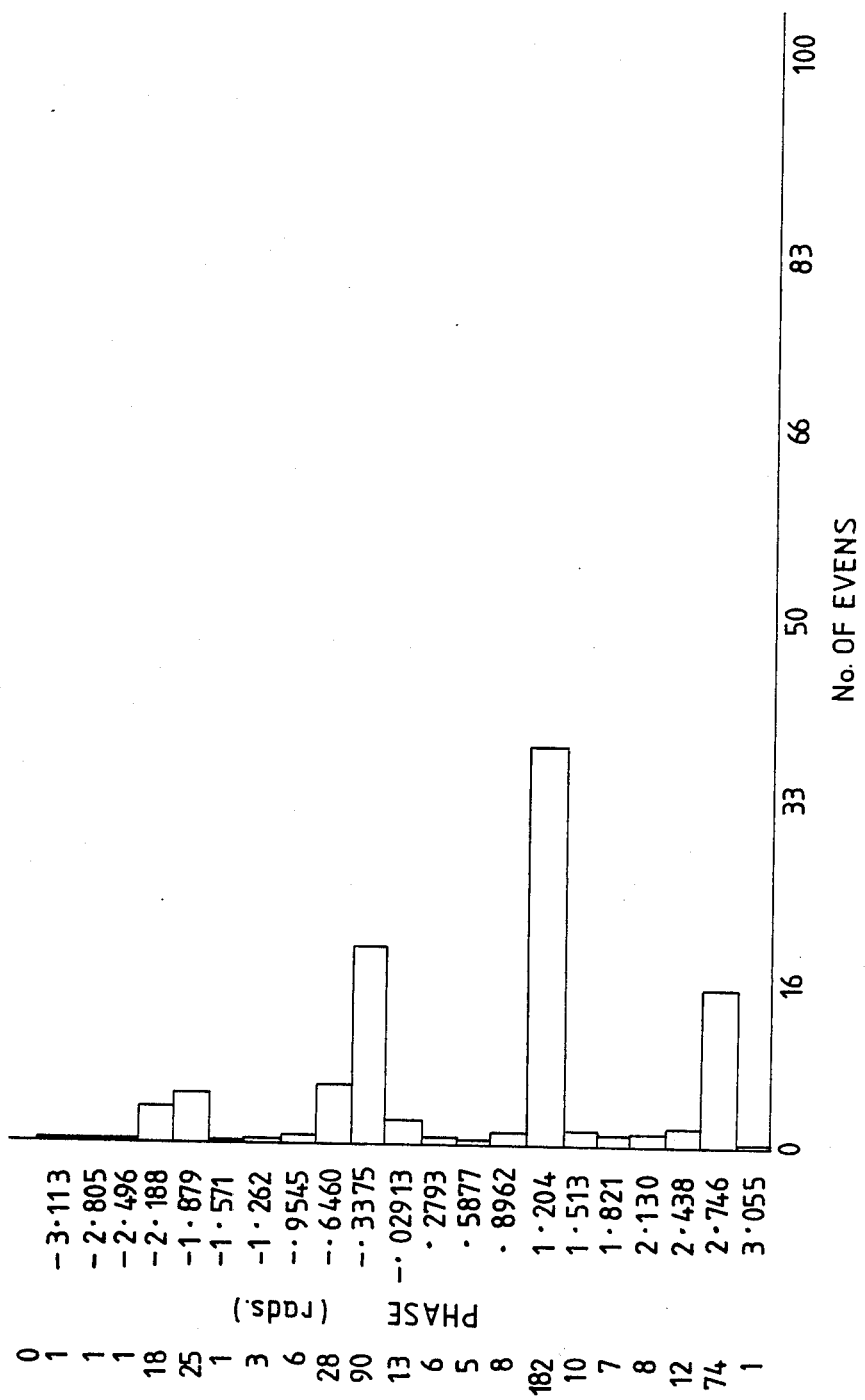

By taking arc tan (Real/Imag), for each data point, a histogram of the phase of the de-modulated output may be plotted. FIG. 9 shows the recorded outputs for typical 2 state and 4 state PSK signals respectively. The histograms are representative of data after the extracted carrier has reached its peak amplitude. Within this sample length there is an approximate total of 20 possible transitions, with 50 data points per transition, corresponding to a baud rate of 200 Hz.

Simulations of signals and the 4-state demodulator algorithm suggest that 2 state PSK is recognised from histogram plots after observing only a few transitions (i.e. 10) at S/N rations down to 0 dB. Four state PSK is obviously less clear with the introduction of two more states, and requires relatively longer observation time for the same degree of recognition. The simulation comprises batch processes with fixed sample lengths. In practice, a continuous process allows the histogram plots to 'grow' until sufficient confidence in a decision has been achieved. In addition, a continuous output of the de-modulated signal is produced.

We claim:

1. A method of recovering data from a signal having an inherently suppressed carrier transmitted over an n-state phase-shift keyed data transmission system comprising the steps of:
    receiving said signal;
    applying said signal to digitizing means to produce a digital representation of said signal,
    applying said digital representation of said signal to digital processing means adapted to recover a digital representation of said inherently suppressed carrier transmitted over said transmission system directly from said digital representation of said signal, and
    subsequently interacting said digital representations of said carrier and said signal to recover said data from said signal.

2. A method according to claim 1, wherein said applying said signal to digital processing means step includes subjecting said digital representation of said signal to a non-linear signal processing step in which a digital representation of the nth order harmonic of said carrier signal is generated, and to process said digital representation of said nth order harmonic to recover said digital representation of said carrier signal.

3. A method according to claim 2, wherein said non-linear signal processing step comprises producing a digital representation of a modulus of said digital representation of said received signal thereby generating digital representations of even order harmonics of said received signal.

4. A method according to claim 3, wherein said processing of said digital representation of said nth-order harmonic comprises performing a lobe removal process and then filtering, digital representations of n−1 consecutive half-wave lobes of the signal thereby being nullified, leaving only digital words corresponding to nth lobes of said signal.

5. A method according to claim 4, wherein n is factorizable, and said lobe removal and filtering comprises frequency dividing by each factor in turn and filtering inbetween each division.

6. A method according to claim 5, wherein n is an even number and said lobe removal and filtering process comprises frequency halving said digital representation of said nth order harmonic and subsequently changing the sign of digital words in alternate lobes of a rectified time series.

7. A demodulator for demodulating a suppressed carrier n-state phase shift keyed data transmission comprising:
    an analogue to digital converter arranged to generate a digital representation of a received signal,
    non-linear processing means operatively connected to said analogue to digital converter and arranged to act on said digital representation of said received signal to generate digital representations of an nth-order harmonic of said carrier signal,
    further processing means operatively connected to said non-linear processing means and arranged to process a signal output by said non-linear processing means to produce a digital representation of said carrier signal,
    Hilbert transform means operatively connected to said further means arranged to provide a Hilbert transform of said digital representation of said carrier signal,
    multiplier means operatively connected to said Hilbert transform means and to said analogue to digital converter and arranged to multiply said digital representations of said received signal and said carrier signal and to multiply the output of said Hilbert transform means with said digital representation of said received signal respectively, and
    data recovery means operatively connected to said multiplier means arranged to recover transmitted data from an output of said multiplier means.

8. A demodulator according to claim 7, wherein said non-linear processing means are arranged to take the modulus of said digital representation of said received signal.

9. A demodulator according to claim 8, wherein said further processing means includes frequency division means to reduce the frequency of said signal output by said non-linear processing means, and filter means to select the digital representation of the carrier signal.

10. A demodulator according to claim 9, wherein said frequency division means are arranged to process said representation of said nth-order harmonic by performing a lobe removal process in which digital representations of n−1 consecutive half-wave lobes of the signal are nullified, thereby leaving only digital words corresponding to nth lobes of the signal.

11. A demodulator according to claim 10, wherein n is factorizable and said further processing means comprise a plurality of stages, each stage including frequency division means arranged to divide by a respective one of said factors and filter means after said frequency division means.

12. A demodulator according to claim 9, wherein said filter means comprises an infinite impulse response band pass filter centred on the frequency of said nth-order harmonic of the carrier signal.

13. A demodulator according to claim 7 wherein said Hilbert transform means comprise a finite impulse response filter.

14. A demodulator according to claim 7, wherein said non-linear processing means and further processing means comprise a programmed computer.

15. A demodulator according to claim 12, wherein said filter means further comprise an infinite impulse response band pass filter center on a factor of said frequency of said nth-order harmonic of the carrier signal.

16. A demodulator for demodulating a suppressed carrier n-state phase shift keyed data transmission comprising:

an analogue to digital converter arranged to generate a digital representation of a received signal, non-linear processing means operatively connected to said analogue to digital converter and arranged to act on said digital representation of said received signal to generate digital representations of an nth-order harmonic of said carrier signal, further processing means operatively connected to said non-linear processing means and arranged to process a signal output by said non-linear processing means to produce a digital representation of said carrier signal, Hilbert transform means operatively connected to said analogue to digital converter arranged to provide a Hilbert transform of said digital representation of said received signal, multiplier means operatively connected to said Hilbert transform means and to said analogue to digital converter and arranged to multiply said digital representations of said received signal and said carrier signal and to multiply the output of said Hilbert transform means with said digital representations of said carrier signal respectively, and data recovery means operatively connected to said multiplier means arranged to recover transmitted data from an output of said multiplier means.

* * * * *